United States Patent [19]

Oe et al.

[11] Patent Number: 5,558,365
[45] Date of Patent: Sep. 24, 1996

[54] TETHERED AIR BAG

[75] Inventors: Naoki Oe; Koki Sato; Keiichi Tamura, all of Aichi-ken, Japan

[73] Assignee: Kabushiki Kaisha Tokai-Rika-Denki Seisakusho, Aichi-ken, Japan

[21] Appl. No.: 337,009

[22] Filed: Nov. 7, 1994

Related U.S. Application Data

[63] Continuation-in-part of Ser. No. 123,168, Sep. 20, 1993, abandoned.

[30] Foreign Application Priority Data

Dec. 18, 1992 [JP] Japan ................................ 4-087032 U

[51] Int. Cl.[6] ................................................ B60R 21/22
[52] U.S. Cl. .................... 280/731; 280/743.1; 280/743.2
[58] Field of Search ............................ 280/743.1, 743.2, 280/731, 728.1, 730.1, 729

[56] References Cited

U.S. PATENT DOCUMENTS

| 3,744,817 | 7/1973 | Ousset ................................ 280/730.1 |
| 5,358,273 | 10/1994 | Onishi et al. ...................... 280/743.1 |

FOREIGN PATENT DOCUMENTS

| 59-114143 | 7/1984 | Japan . |
| 2237248 | 5/1991 | United Kingdom ................... 280/731 |

Primary Examiner—Eric D. Culbreth
Assistant Examiner—Peter C. English
Attorney, Agent, or Firm—Fisher & Associates

[57] ABSTRACT

An apparatus is provided for an air bag mounted in a Vehicle such that a steering wheel rotates with respect to the air bag. The air bag inflates towards an occupant upon sudden decelerations of the vehicle, thereby protecting the occupant's head. The air bag includes a lower portion formed into a substantially straight line restricting the air bag's expanded volume and height to facilitate use with a seat belt.

4 Claims, 10 Drawing Sheets

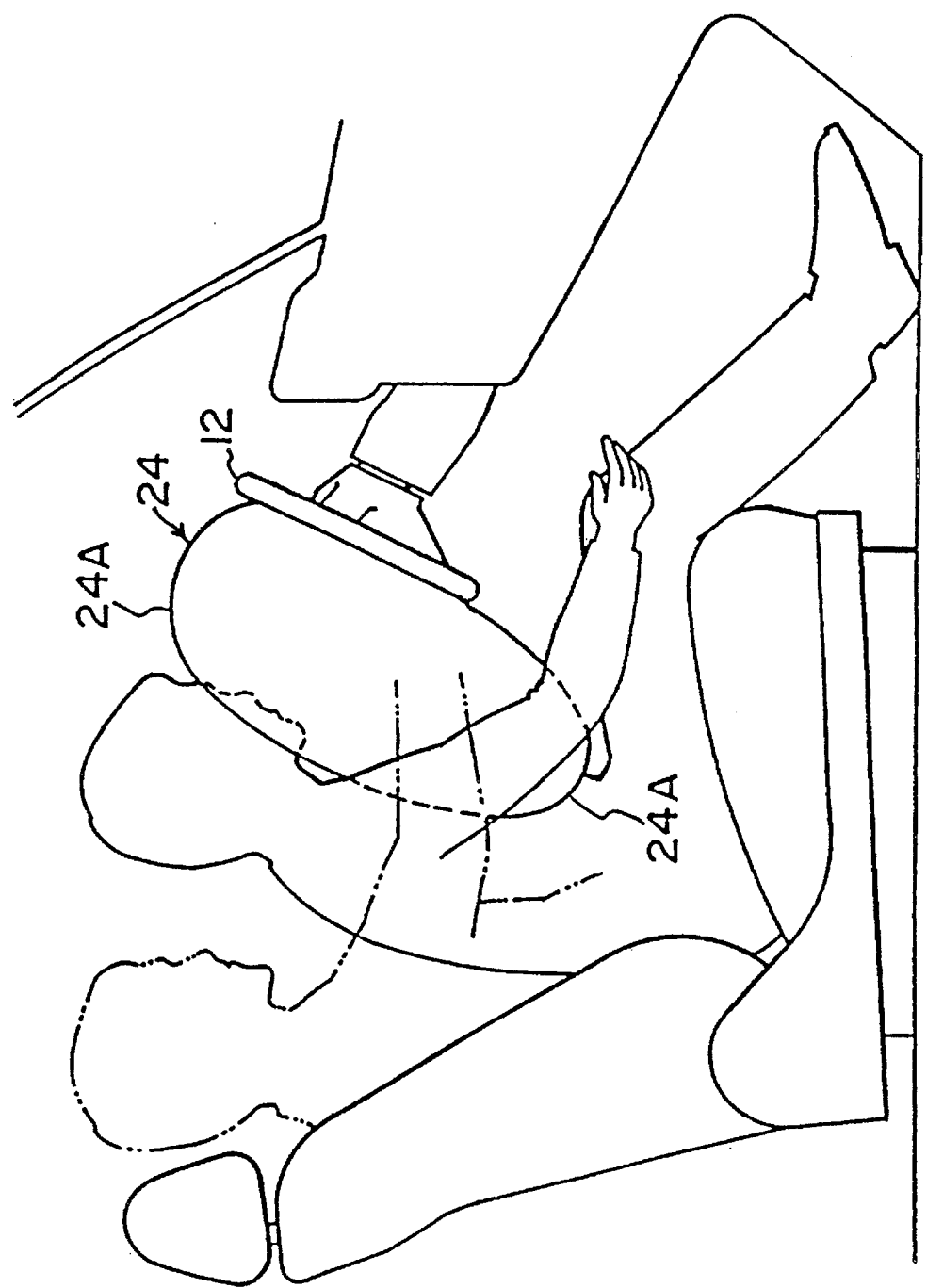

TETHERED AIR BAG

CROSS-REFERENCE TO RELATED APPLICATIONS

This application is a continuation-in-part of application Ser. No. 08/123,168, filed on Sep. 20, 1993, abandoned.

BACKGROUND OF THE INVENTION

1. Field of the Invention

The present invention relates to an air bag apparatus which causes a bag body to expand toward the side of an occupant upon sudden deceleration of a vehicle and to a bag body suitable for use in the air bag apparatus and, more particularly, to an air bag apparatus and a bag body provided with a stationary pad or the like so as to be in an immobile state.

2. Description of the Related Art

An air bag apparatus of a type that can be, for example, mounted on a steering wheel, comprises a starting apparatus which senses the sudden deceleration of a vehicle, an inflator which expels gas upon actuation of the starting apparatus, and a bag or the like which is expanded toward the side of an occupant by the gas expelled from the inflator.

On the inner circumferential surface of the bag, there are one or a plurality of straps which are usually made of cloth and are folded inside the bag when the air bag apparatus is in its inactive state, that is, when the bag is in the folded state. During the sudden deceleration of a vehicle, the bag tends to expand toward the side of the occupant in the form of a sphere. Because the length of the strap is shorter than the diameter of the inflated bag without the strap, the bag cannot expand to its fullest. Therefore, as shown in FIG. 8, bag 100 takes the shape of a flat sphere when expansion is completed. During the vehicle's sudden deceleration, the inertial movement of the occupant's head is such that it strikes the approximate center portion of the bag 100, thereby protecting the occupant from injury.

Since the air bag apparatus is to be used in combination with a seat belt apparatus provided in a vehicle, a primary object of the inflated air bag is to protect the head of the occupant.

However, in the case of bag 100, when expansion is completed and the shaped bag is in the form of a flat sphere, a problem arises in that an upper end portion 100A of the bag 100 excessively extends past the top of the head 102 of the occupant.

Further, since the bag of a conventional air bag apparatus is inflated in the form of a flat sphere as described above, so as to be interposed between the steering wheel and the occupant, the bag is made larger than necessary. Therefore, it is necessary to generate a large quantity of gas in order to inflate the bag instantaneously.

SUMMARY OF THE INVENTION

In consideration of the above, it is an object of the present invention to provide an air bag apparatus in which the upper end portion of an air bag of the air bag apparatus does not unnecessarily expand past a top portion of an occupant's head which strikes the air bag due to an inertial force as a result of a sudden deceleration of a vehicle.

It is another object of the present invention to provide an air bag apparatus and an air bag thereof which is capable, when inflated, of not only ensuring the protection of the head of an occupant by causing the bag to be interposed in an optimum state between the steering wheel and the head of an occupant but also to provide an air bag that is not larger in size than necessary so as to reduce the amount of base material for the bag and the quantity of gas necessary for inflation, thereby reducing cost.

According to the present invention, an air bag apparatus to be mounted in a vehicle in an immovable state, comprises:

a stationary pad held immovable during turning of a steering wheel;

a heteromorphic bag accommodated in its folded state in said stationary pad; and an inflator for jetting gas into said bag when a vehicle is subjected to sudden deceleration.

According to the present invention, an air bag apparatus to be mounted in a vehicle in an immovable state, comprises:

a heteromorphic bag accommodated in its folded state in a door of the vehicle; and an inflator for jetting gas into said bag when a vehicle is subjected to sudden deceleration.

According to the present invention, an air bag apparatus disposed in a vehicle in an immovable state, wherein a bag is inflated in a state of sudden deceleration of a vehicle to protect an occupant by being interposed between the vehicle body and the occupant, comprises:

a stationary pad held immovable during turning of a steering wheel; and a heteromorphic bag accommodated in its folded state in said stationary pad, said bag including, in its inflated state, a portion corresponding to the head of the size of the occupant and a portion corresponding to a portion other than the head of said occupant, wherein said bag, in an inflated state, is formed so that the portion corresponding to a portion other than the head of said occupant is made small as compared with the portion corresponding to the head of said occupant.

An air bag apparatus according to the present invention further comprises an inflator which expels gas upon sudden deceleration of a vehicle, a bag which is suitable for use in an air bag apparatus and arranged in a folded state on the occupant side of the inflator, and a restricting member made of a soft material with both ends thereof being attached to the surface of the inner circumference of the bag so as to restrict the expansion height of the bag which tends to expand in the form of a sphere toward the occupant by the expelled gas upon sudden deceleration of a vehicle. The air bag apparatus can be mounted onto an immobile portion, such as a stationary pad on a vehicle. The mounting position of one end of the aforementioned restricting member is in the vicinity of the aforementioned inflator. The mounting position of the other end of the restriction member is displaced by a predetermined length in the direction of the radius of the inflator with reference to the axis of the inflator.

According to the above aspect of the present invention with the above-mentioned construction, in a state other than during the sudden deceleration of a vehicle, the bag is arranged in a folded state on the occupant side of the inflator. When this state changes to one in which there is a sudden deceleration of a vehicle, gas is expelled from the inflator and the bag expands toward the occupant side.

At this point, the bag tends to expand in the form of a sphere. However, the form is more like a flat sphere because the expansion height thereof is restricted by a predetermined tension of the restriction member which is made of a soft material and attached to the surface of the inner circumference of the bag.

According to the present invention, because the mounting position of one end of the restricting member is in the vicinity of the inflator and the mounting position of the other end of the restricting member is displaced by the predetermined length in the direction of the radius of the inflator with reference to the axis of the inflator, the shape of the bag, upon completion of expansion action, changes as follows.

In other words, because the bag always expands toward the occupant side, if both ends of the restriction member are mounted along the center line (the axis of the inflator) of the bag, the bag will expand in the form of a flat sphere, as described above. However, because the mounting position of the other end of the restricting member is displaced by the predetermined length in the direction of the radius of the inflator, the amount of inflation in the aforementioned displaced direction is decreased while the amount of inflation in the opposite direction of the displaced direction is increased.

As a comparison of the above, imagine a cross-sectional view of the bag cut by a plane which includes the axis of the inflator and is along a direction which is at a right angle to the surface of the restricting member, in the case of the former, because both ends of the restricting member are mounted along the center line of the bag, the bag, from a cross-sectional view, is divided into two equal parts bordering the restricting member. However, in the case of the latter, because the mounting position of the other end of the restricting member is displaced by the predetermined length, the area on the displaced side of the cross-sectional view bordering the restricting member becomes small and the area on the opposite side of the displaced side becomes large. Therefore, if a solid body is used, the above will be realized.

If the bag is disposed so that the side of the head of an occupant is on the side of the head of an occupant is on the side of the bag where the amount of inflation has decreased and that the side of the chest of the occupant is on the side of the bag where the amount of inflation has increased, it is possible to prevent the upper end portion of the bag from being positioned at a level that is more than necessary from the position of the head of the occupant. By arranging the restricting member in such a manner, the portion of the bag corresponding to the portion other than the head of the occupant may be formed small, thereby making a small bag.

In an air bag which is used in an air bag apparatus to be provided in a stationary state (immobile) at the center of the steering wheel and is inflated upon the sudden deceleration of the vehicle so as to be interposed between the body of a vehicle, such as the steering wheel, and an occupant so as to protect the occupant, the portion corresponding to a space between the lower part of the steering wheel and the chest of the occupant is formed smaller as compared with the portion corresponding to a space between the upper part of the steering wheel and the head of the occupant when the air bag is inflated.

In an air bag for an air bag apparatus with the above construction, when a vehicle reaches the state of sudden deceleration, the bag inflates so as to be interposed between the steering wheel and an occupant. By this operation, the occupant is protected.

The air bag apparatus according to another aspect of the present invention is used in combination with a seat belt apparatus provided in a vehicle. In other words, the chest of an occupant is particularly protected by the webbing of the seat belt apparatus. The head of the occupant is also protected by the inflated bag. Therefore, there is no problem even if the portion corresponding to the space between the lower portion of the steering wheel of the inflated bag and the chest of the occupant is formed small, as compared with the portion corresponding to the space between the upper part of the steering wheel and the head of the occupant.

Because the bag according to the present invention is not formed larger than necessary, as in the case of a conventional bag, it is possible to reduce the base material of the air bag to a greater extent than that of the conventional bag. It is also possible to reduce the amount of gas necessary to inflate the bag instantaneously.

As has been described, the bag in its inflated state is capable of ensuring the protection of an occupant by being interposed between the steering wheel and the occupant. In addition, the size of the air bag is not made larger than necessary so as to reduce the amount of the textile base material and the amount of gas necessary for inflation. These factors reduce cost.

According to one aspect of the present invention, for achieving the above object, an air bag apparatus is provided, which can be mounted in a vehicle in an immobile state and comprises an inflator which expels gas upon the sudden deceleration of a vehicle, a bag arranged in a folded state on the occupant side of the inflator and a restricting member formed of a soft material with both ends thereof being attached to the inner circumferential surface of that bag so as to restrict the expansion height of the aforementioned bag which tends to expand in the form of a sphere toward the occupant side by the gas expelled upon the sudden deceleration of a vehicle, wherein the attaching position of one end of the restricting member is disposed in the vicinity of mounting position of the inflator and the attaching position of the other end of the restricting member is displaced by a predetermined length in the direction of the radius of the inflator with reference to the axis of the inflator.

According to a further aspect of the present invention, an air bag apparatus is provided, which can be mounted in a vehicle in an immobile state and comprises an inflator which expels gas upon the sudden deceleration of a vehicle, a bag arranged in a folded state on the occupant side of the inflator, and a restricting member formed of a soft material with the both ends thereof being attached to the inner circumferential surface of the bag so as to restrict the expansion height of the aforementioned bag which tends to expand in the form of a sphere toward the occupant side by the gas expelled upon the sudden deceleration of a vehicle, wherein the bag in an inflated state is formed so that the portion corresponding to a portion other than the head of an occupant is small, as compared with the portion corresponding to the head of the occupant.

According to an even further aspect of the present invention, there is provided a bag which is used in an air bag apparatus to be arranged in a vehicle in an immobile state so as to protect an occupant by being interposed between the vehicle body and an occupant upon inflation caused by the sudden deceleration of a vehicle and comprises in an inflated state a portion corresponding to the head of the occupant and a portion corresponding to a portion other than the head of the occupant. The aforementioned bag is formed, in an inflated state, so that the portion corresponding to a portion other than the head of the occupant is small compared to the portion corresponding to the head of the occupant.

The bag suitable for use in the air bag apparatus according to the present invention can be formed small in size, reduce the amount of textile base material and the quantity of generated gas thereby reducing cost and securing the protection of an occupant in a vehicle.

The above and other objects, features and advantages of the present invention will become apparent from the following description and the appended claims, taken in conjunction with the accompanying drawings, in which the preferred embodiments of the present invention are shown by way of illustrative example.

BRIEF DESCRIPTION OF THE DRAWINGS

FIG. 4 is a schematic side view depicting a state of a vehicle equipped with the air bag apparatus of FIG. 1 after the vehicle is brought to sudden deceleration;

DETAILED DESCRIPTION OF THE PREFERRED EMBODIMENTS

Referring now in detail to FIGS. 1 through 4, an air bag apparatus 10 according to a first embodiment of the present invention will be described.

Figure 3A:
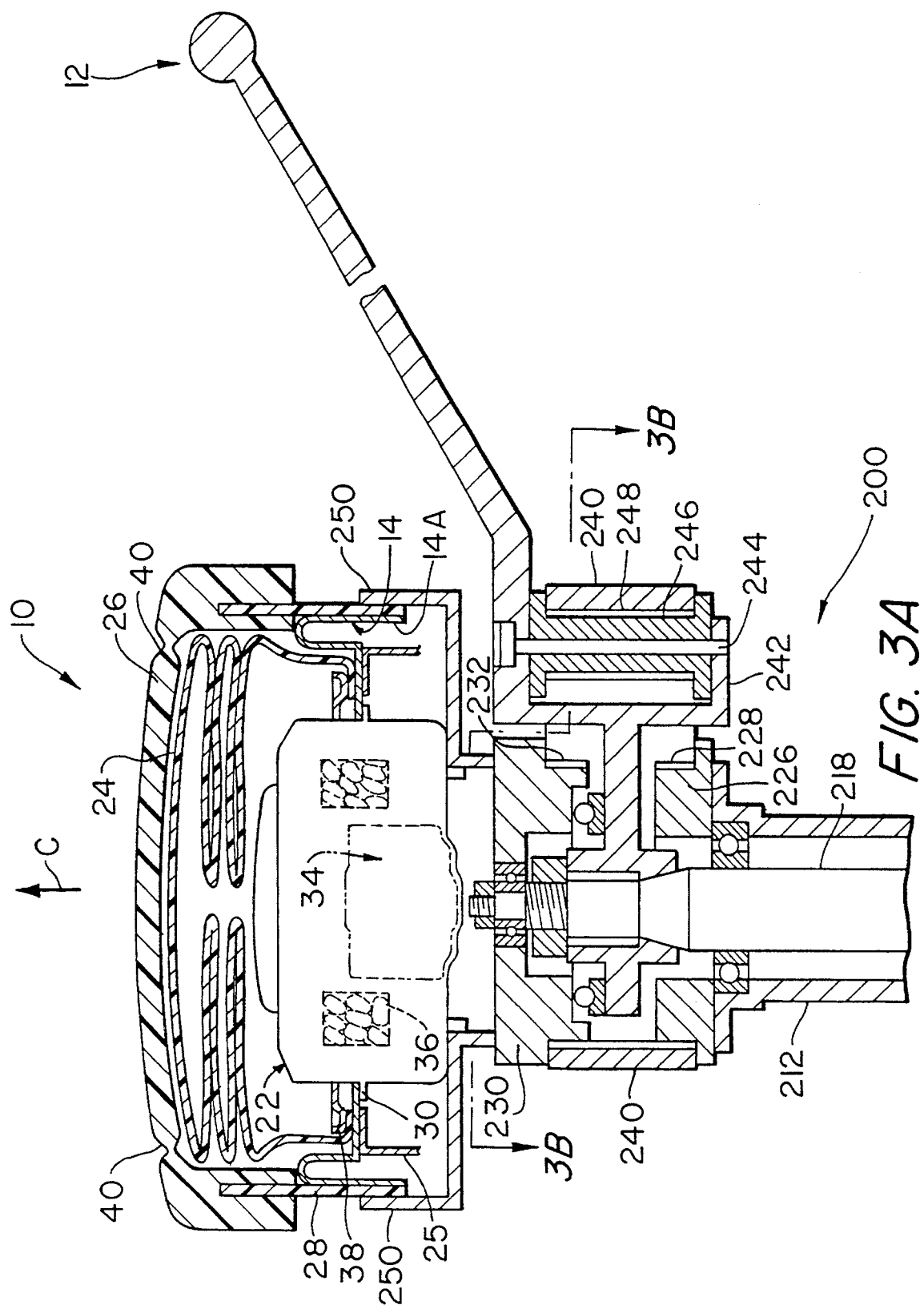
FIG. 3A is a cross-sectional view indicating the overall structure of an air bag apparatus of FIG. 1.

As shown in FIG. 3A, the air bag apparatus 10 is mounted on a sum gear 230 provided on a pair of arm portions 242 of a steering wheel 12 by means of a supporting bracket 250.

The air bag apparatus 10 has a base plate 14 in the form of a substantially rectangular parallelopiped shape. Integrally formed on an outer circumference portion of the base plate 14 is a supporting flange 14A which is bent in a U-shape and suspended vertically toward the opposite side of the vehicle occupant. In the center of the base plate 14, a circular hole is formed. An inflator 22, an air bag 24, an inflator cover 25 and an insert plate 28 embedded inside an air bag cover 26 are mounted to base plate 14.

The inflator 22 is formed in a substantially column-shape. Half of the inflator 22, on the occupant side (the direction of the arrow C in FIG. 3A) is inserted through the circular hole in the base plate 14. At an intermediate portion of the inflator 22, in the axial direction, a flange 30, which is shaped in the form of a square, extends in the direction of the radius of the inflator 22, and is fastened to the surface of the base plate 14 on the side opposite the occupant (the direction opposite to the direction of the arrow C in FIG. 3A) by means of a bolt or the like (not shown). In the surface of the circumference of the inflator 22 on the occupant side of a plurality of gas holes 23 (refer to FIG. 1) are formed at predetermined intervals.

In the axial center of the inflator 22, a starting apparatus 34 is arranged which activates upon the sudden deceleration of a vehicle. An outer circumference portion of the starting apparatus 34 accommodates an unillustrated detonator, a booster and a gas generating agent 36. A plurality of kinds of filters (not shown) are disposed between the gas generating agent 36 and the gas holes 23. Therefore, during the state of sudden deceleration of a vehicle, the starting apparatus 34 activates to ignite the detonator thereby causing the gas generating agent 36 to combust via the booster so as to generate a large amount of gas from the inflator 22. The gas is subjected to cooling and debris removal or the like by the filters and guided into the air bag 24 through the gas holes 23.

The bag 24 is positioned in a folded state on the occupant side of the base plate 14 so as to cover the occupant side portion of the inflator 22 in the axial direction. The bag 24 is formed by sewing the outer circumferences of two circular textile bases (on one of the circular textile bases is formed a circular hole for penetrating the inflator 22) and turned over from the side of the said circular hole. The edge of the opening side of the air bag 24 is mounted at a substantially center portion of the base plate 14 via a ring plate 38. The ring plate 38 is fastened to the base plate 14 by means of unillustrated bolts so that the edge of the opening side of the air bag 24 fits tightly against the base plate 14.

The inflator cover 25 is box-shaped so as to accommodate the portion of the inflator 22 opposite the occupant side. A contact plate for activating an unillustrated horn which is urged toward the occupant side is also provided.

The air bag cover 26 is also box-shaped and has a substantially H-shape, thin portion 40 formed on the surface side opposing an occupant. Therefore, in a state of sudden deceleration of the vehicle, the air bag cover 26 is ruptured along the thin portion 40 so as to break open and separate.

Inside the bag 24, a strap 42 (shown in FIG. 1) is provided, which serves as a restricting member. The strap 42 is made of cloth or the like and has heat resistance as excellent as that of the bag 24. The length of strap 42 is set to a dimension shorter than the diameter of the bag 24 in the expanded state. The strap 42 is a wide textile, but may be composed of two or more narrow textiles.

Figure 1:
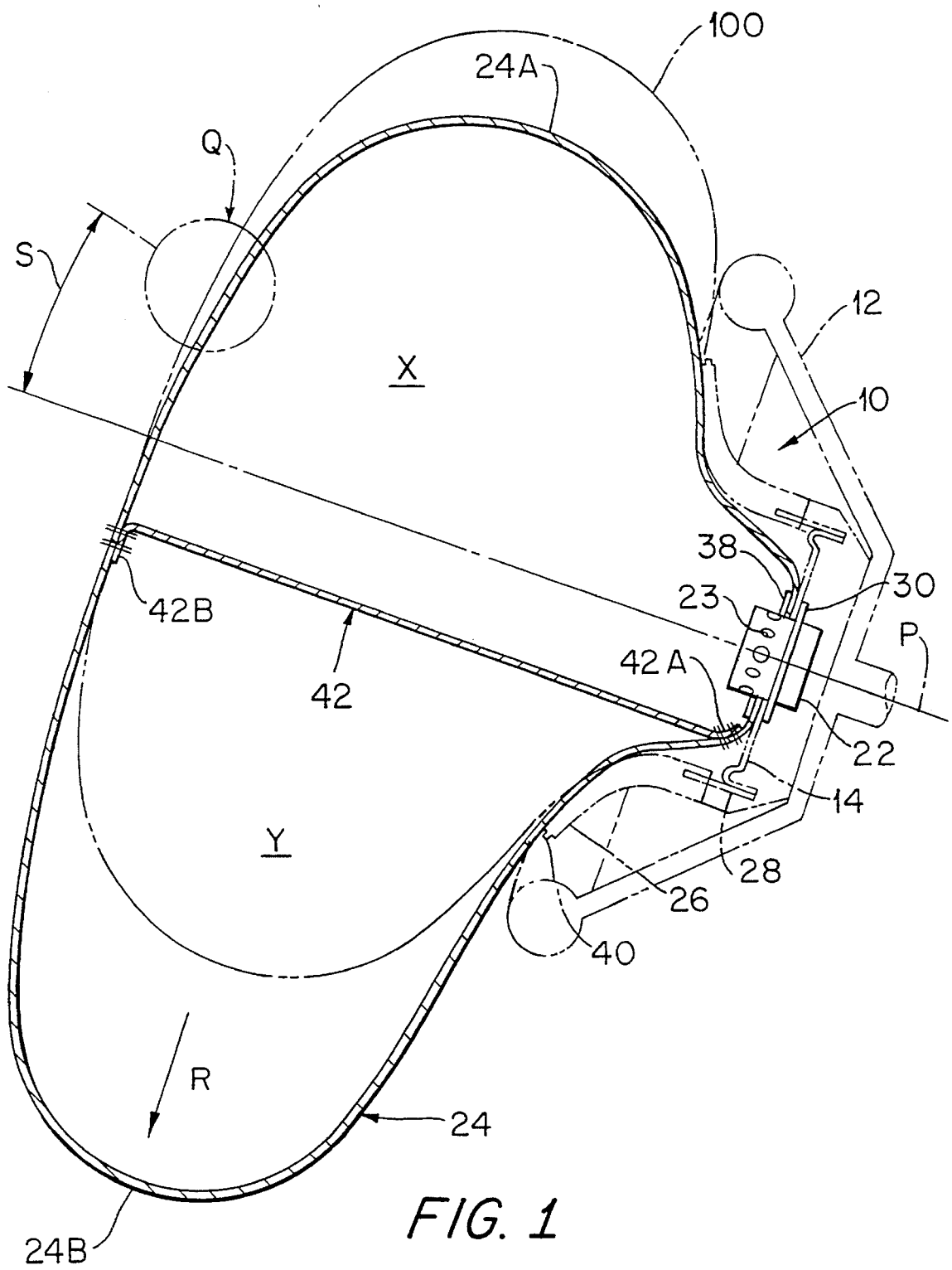
FIG. 1 is a cross-sectional view showing an air bag of an air bag apparatus according to the present invention in an expanded state compared with that of a conventional bag.
Figure 8:
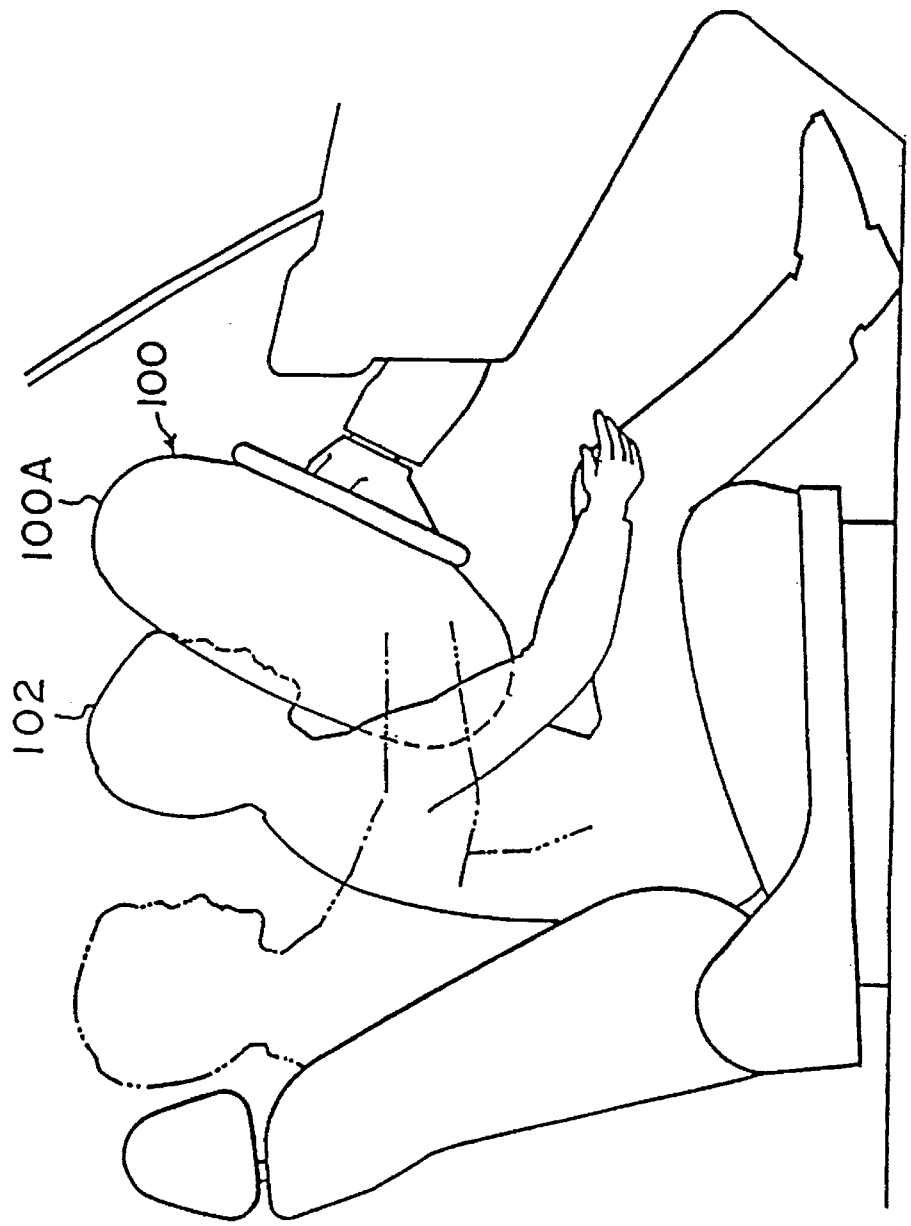
FIG. 8 is a schematic side view corresponding to FIG. 3A which shows a state in which a vehicle equipped with an air bag apparatus according to the prior art is subjected to the state of sudden deceleration.

One end 42A of the strap 42 is sewn in the vicinity of the ring plate 38 (in the vicinity of the lower side of the ring plate 38 in the state shown in FIG. 1). The other end 42B of the strap 42 is attached to a position displaced to the upper side by a predetermined length with respect to the axis (the dash and dotted line P of FIG. 1) of the inflator 22, from the position for mounting on the conventional bag 100 shown in FIG. 8. We shall now expand in more detail.

In FIG. 1, the dash and dotted line represents an imaginary line of the external form of a conventional bag 100. The center line of the conventional bag 100 is nearly equal to the axis of the inflator 22. In short, it can be assumed that the mounting position of both ends of the conventional strap are positioned along the axis of the inflator 22.

In contrast, according to the present embodiment, the mounting position of one end 42A of the strap 42 is in the vicinity of the periphery of the ring plate 38 and is actually not on the axis of the inflator 22. As a model, it may be said that the mounting position is located on the axis of the inflator 22 (note that this is same as the conventional structure). Therefore, when looking at it from only one end 42A of the strap 42, the mounting position can be said to be the same as that of the conventional strap.

However, the mounting position of the other end 42B of the strap 42 according to the present embodiment is deemed to be at the portion indicated by the arrow Q on the inner circumferential surface of the conventional bag 100. In other words, the other end 42B is displaced by the predetermined length S toward the radius of the inflator 22 from the axis of the inflator 22. By this arrangement, the shape of the bag 24 upon completion of expansion is changed to a flat sphere extended by a predetermined amount toward the chest side of an occupant from a flat spherical shape.

The operation of the present embodiment will now be described.

In a state other than the sudden deceleration of a vehicle, because the starting apparatus 34 maintains a non-operating state, there is no possibility of gas expelling from the inflator 22. Therefore, as shown in FIG. 3A, the air bag 24 is accommodated in a folded state in the space between the base plate 14 and the air bag cover 26.

Figure 2:
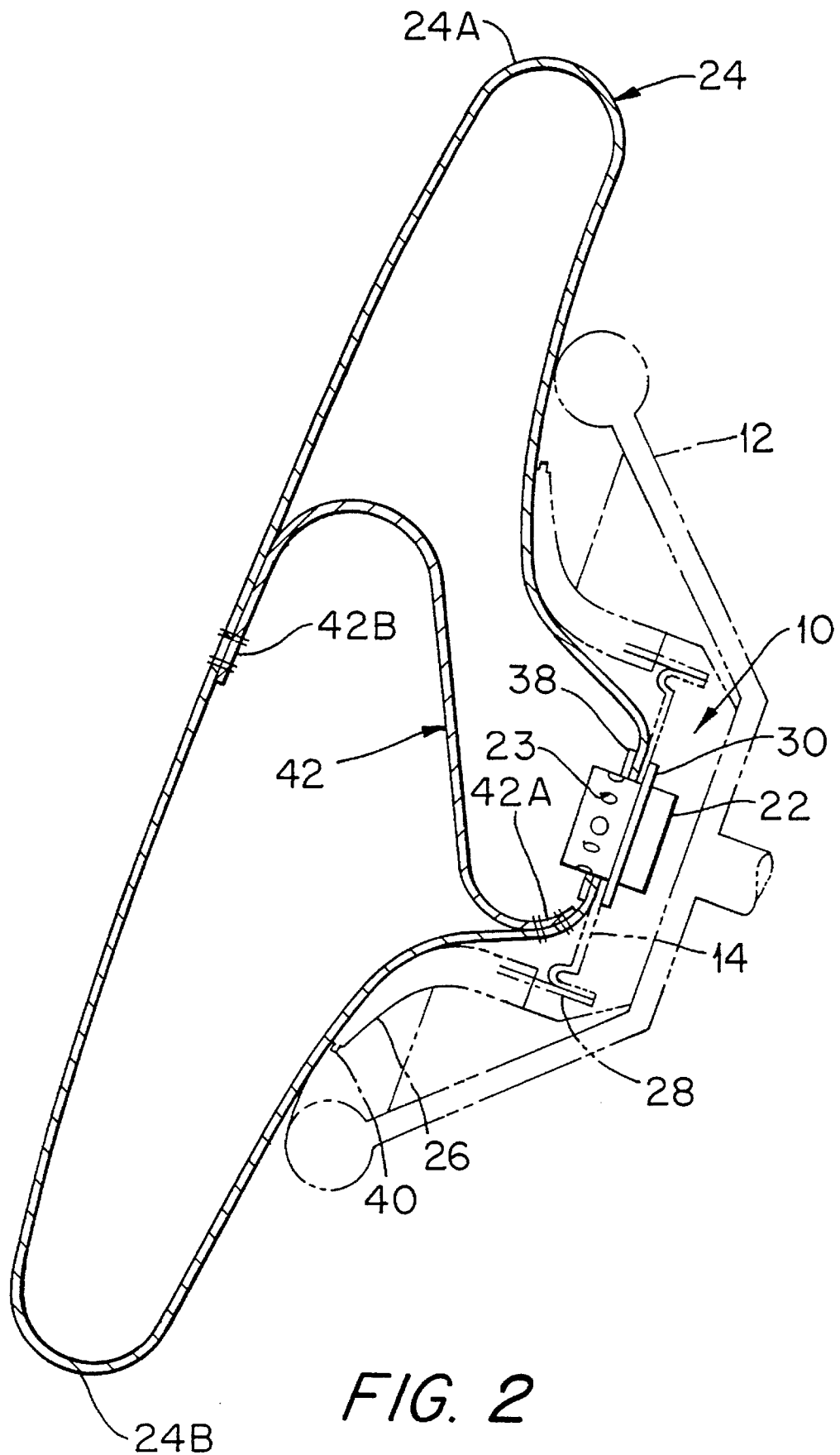
FIG. 2 is a cross-sectional view corresponding to FIG. 4 showing a state of the bag during expansion.

When the state changes to one of deceleration of a vehicle, the starting apparatus 34 activates. Thus, an unillustrated detonator is ignited to combust the gas agent 36 by means of the booster so as to expel a large amount of gas into the bag 24. Therefore, as shown in FIG. 2, the air bag 24 is inflated causing the air bag cover 26 to rupture at the thin portion 40. Having broken through the cover 26, the air bag 24 continues to expand in the form of a sphere toward the occupant side. However, because the length of the strap 42 is set to a dimension that is shorter than the diameter of the inflated bag 24 without a strap 42, the expansion height of the air bag 24 is restricted. Thus, the air bag 24 tends to take the shape of a flat sphere.

According to the present embodiment, the mounting position of the other end 42B of the strap 42 is displaced by the predetermined length S from the conventional mounting position. Therefore, after the strap 42 has pulled the other end 42B with a certain degree tension, gas flows into the direction of the arrow R of FIG. 1. Therefore, with the air bag 24 being in a state shown in FIG. 1, the amount of inflation of the portion (X) which is above the strap 42 is decreased by the amount corresponding to the length S used to displace the mounting position of the other end 42B of the strap 42 while the amount of inflation of the portion (Y) which is below the strap 42 is greater. As a result of this, as shown in FIG. 4, the upper end 24A of the air bag 24 is positioned at the head of an occupant who is moved by inertia upon the sudden deceleration of a vehicle while the lower end 24B of the air bag 24 is positioned in the vicinity of the stomach of the occupant. Therefore, it is possible to further improve occupant protection performance of the air bag apparatus 10 with the air bag 24 according to the present embodiment when compared with an air bag apparatus using the conventional bag 100.

Figure 9:
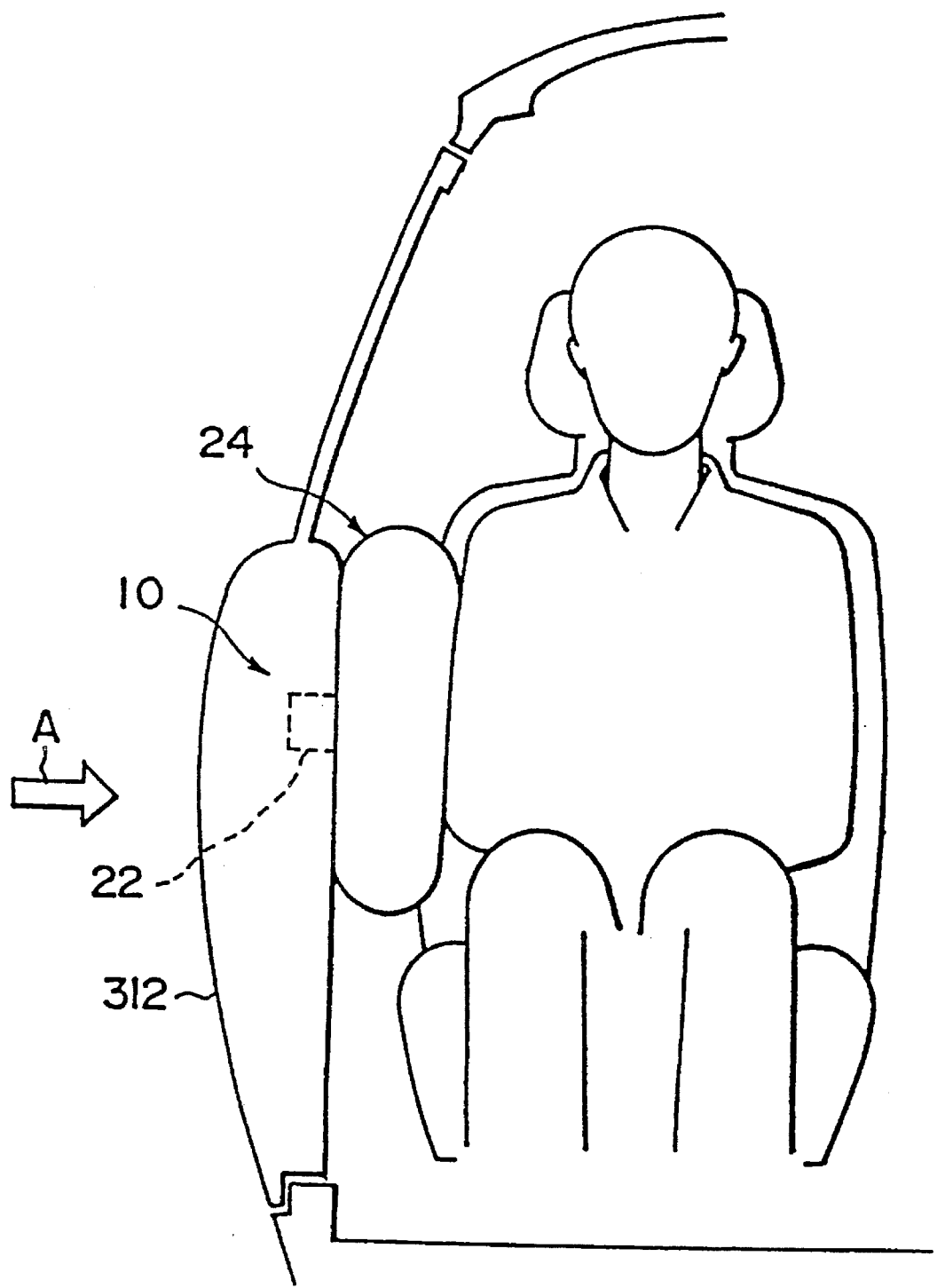
FIG. 9 is a schematic, overall structural view illustrating a case in which the air bag apparatus is applied to a vehicle door.

According to the present embodiment, the air bag apparatus 10 is applied to the driver's seat side but should not be limited thereto. The apparatus 10 can be applied to all air bag apparatuses which need to change the shape of the bag 24 by the strap 42 when expansion is completed. For example, as shown in FIG. 9, applying the bag of the present invention to an air bag apparatus 10 that is arranged in the door 312 of a vehicle can be considered.

In the present invention, the air bag apparatus 10 on the driver's seat side is described and not the air bag apparatus 10 in relation to the steering wheel 12. However, it is preferable to apply the air bag according to the present invention to an air bag apparatus which has a so-called stationary pad mechanism installed in the steering wheel which appears to be stationary regardless of the amount of rotation of the steering wheel 12 by using a planetary gear structure 200 or the like.

The planetary gear structure 200 will be described hereinafter. A fixed gear 226 is fixed to an end portion of a pipe 212. A gear-shaped training portion 228 is formed continuously over the entire outer peripheral surface of the fixed gear 226. A sun gear 230 is attached to an end portion of the steering shaft 218. A training portion 232 is formed continuously over the entire outer peripheral surface of the sun gear 230, in the same way as the training portion 228. The sun gear 230 is disposed so as to be separated by a predetermined space from the fixed gear 226, and is attached so as to be able to rotate relatively with respect to the steering shaft 218. A lower edge portion and an upper edge portion of a timing belt 240, which will be described later, are trained around the training portion 228 of the fixed gear 226 and the training portion 232 of the sun gear 230, respectively.

Figure 3B:
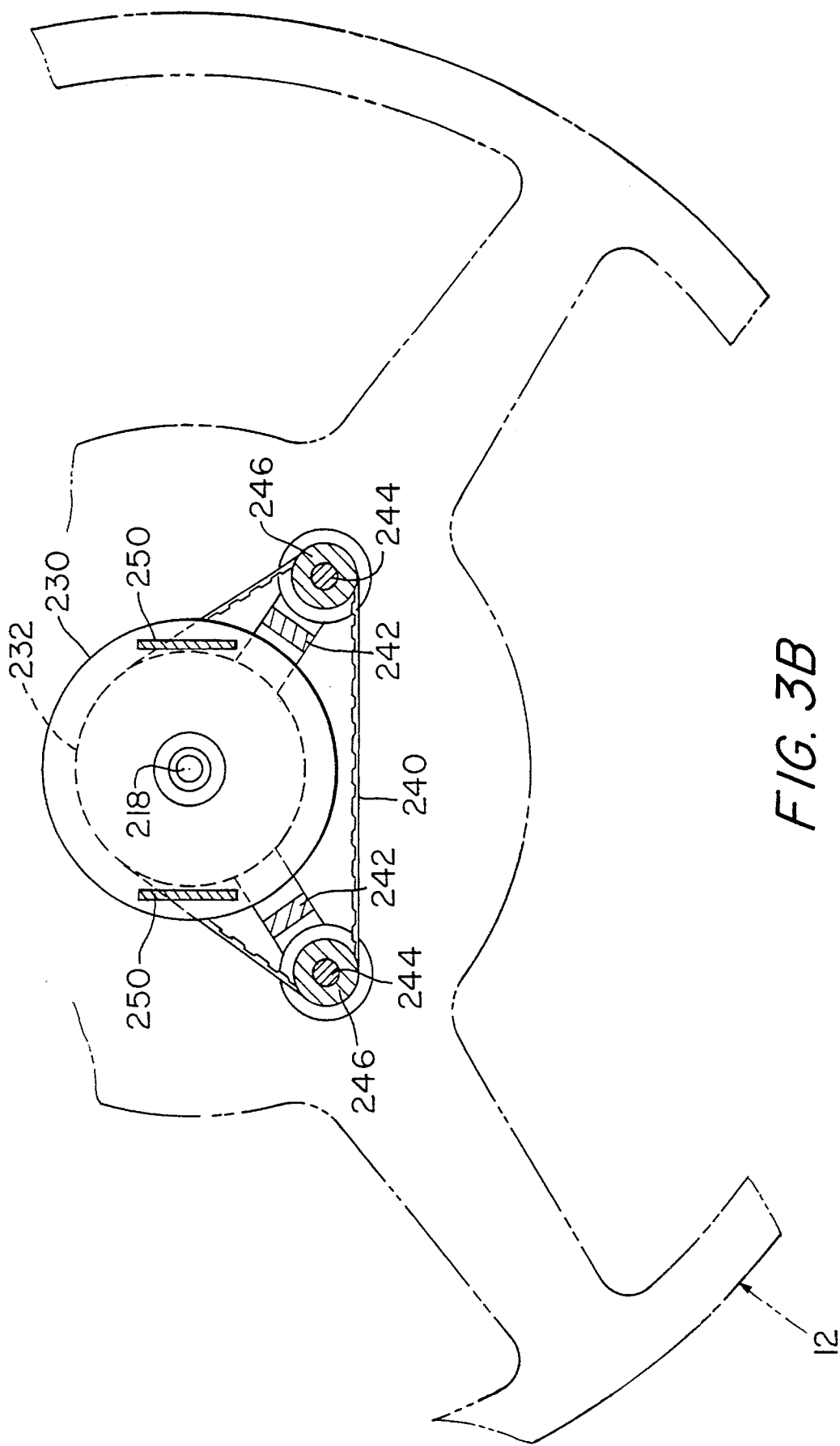
FIG. 3B is a cross-sectional view taken along line 3B—3B of FIG. 3A.

As illustrated in FIG. 3B, a pair of arm portions 242 are formed at the lower surface of the steering wheel 12, and a supporting shaft 244 is disposed at each of the arm portions 242. The supporting shafts 244 are fixed parallel to the axial direction of the steering shaft 218, and a planetary gear 246 is supported at each supporting shaft 244. A training portion 248, which is similar to the training portion 228 of the fixed gear 226 and the training portion 232 of the sun gear 230, is formed at the outer peripheral surface of the planetary gear 246. The timing belt 240, which is trained around the training portion 228 and the training portion 232, is continuously trained around the training portions 248 as well. The timing belt 240 is endless and is trained around the fixed gear 226, the sun gear 230 and the pair of planetary gears 246.

The air bag apparatus 10, having a stationary pad, is attached via a bracket 250 to the upper surface of the sun gear 230 of the planetary gear structure 200 having the above-described structure.

In the planetary gear structure 200 described above, even if the steering wheel 12 (the steering shaft 218) rotates, the sun gear 230 remains in a stationary state and the planetary gears 246 move around the steering wheel 12, the fixed gear 226 and the sun gear 230. As a result, the air bag apparatus 10 attached to the sun gear 230 remains in a stationary state without rotating, even if the steering wheel 12 rotates.

Accordingly, when the air bag apparatus 10 attached to the sun gear 230 is activated, the bag can be expanded and unfolded into a predetermined configuration (to a predetermined position) regardless of the rotational position of the steering wheel 12.

A second embodiment according to the present invention will now be described.

Figure 5:
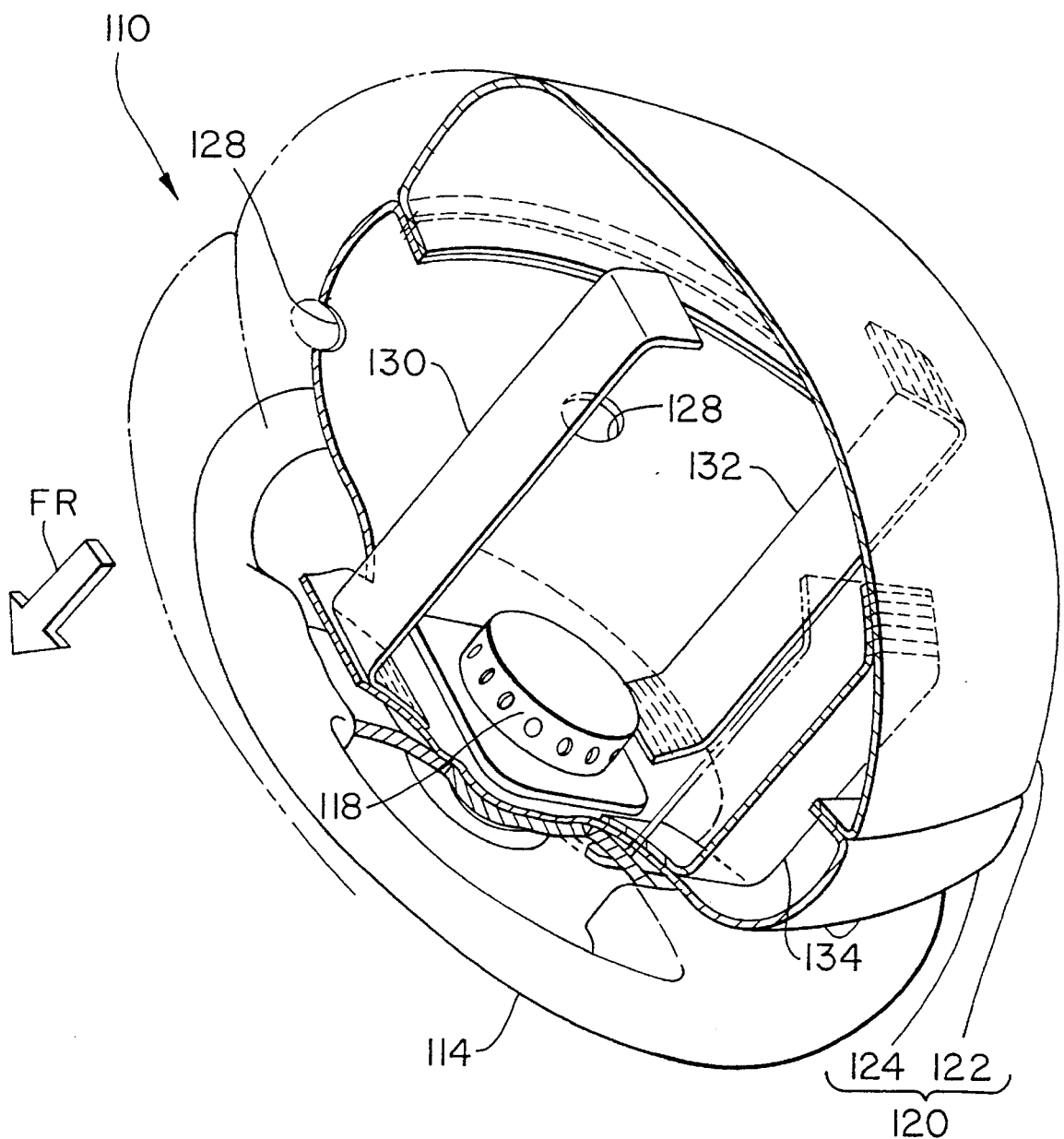
FIG. 5 is a partial broken perspective view showing a structure of a bag in expanded state of an air bag apparatus according to the second embodiment of the present invention.
Figure 6:
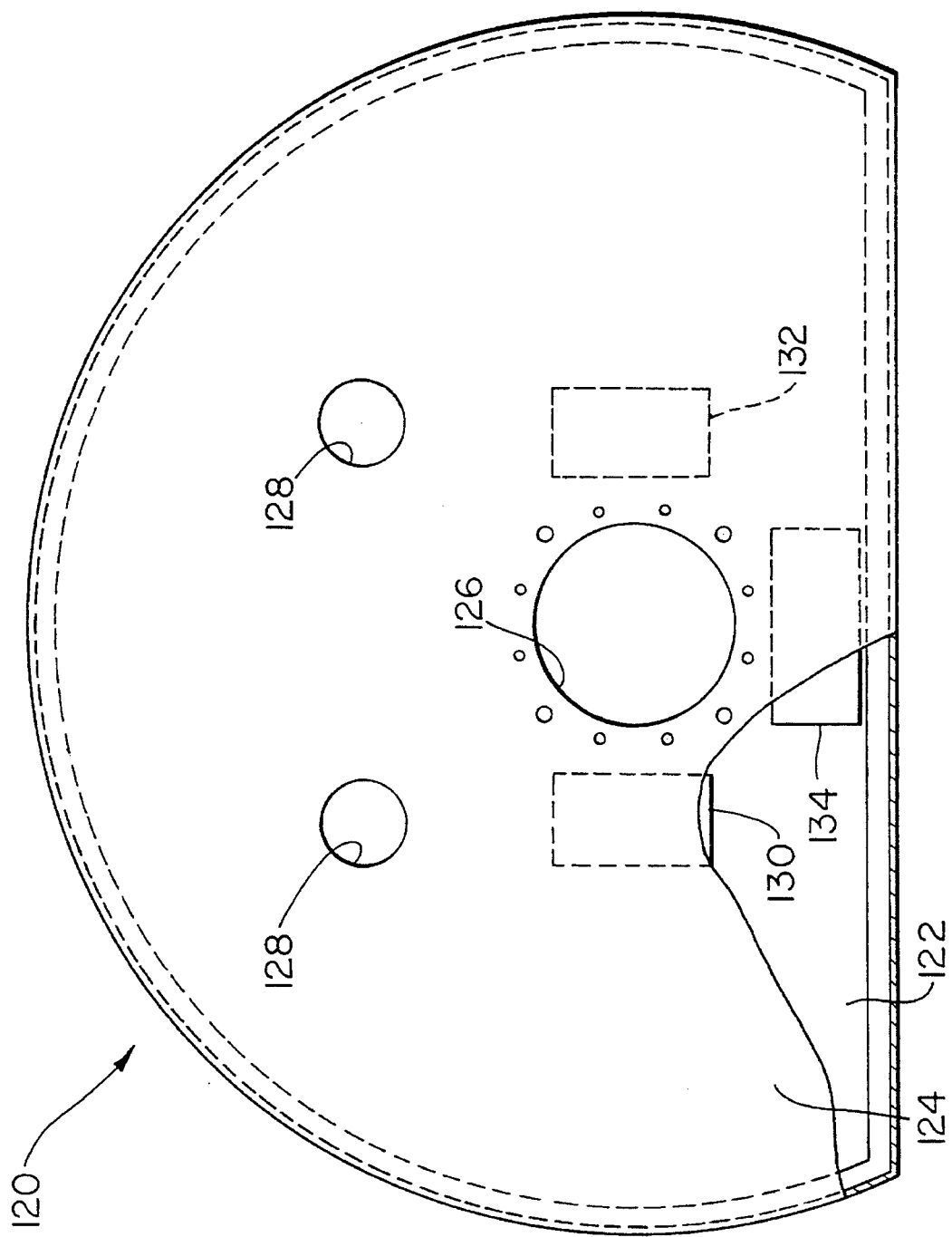
FIG. 6 is a plan view illustrating a shape of the bag according to the second embodiment of the present invention.
Figure 7:
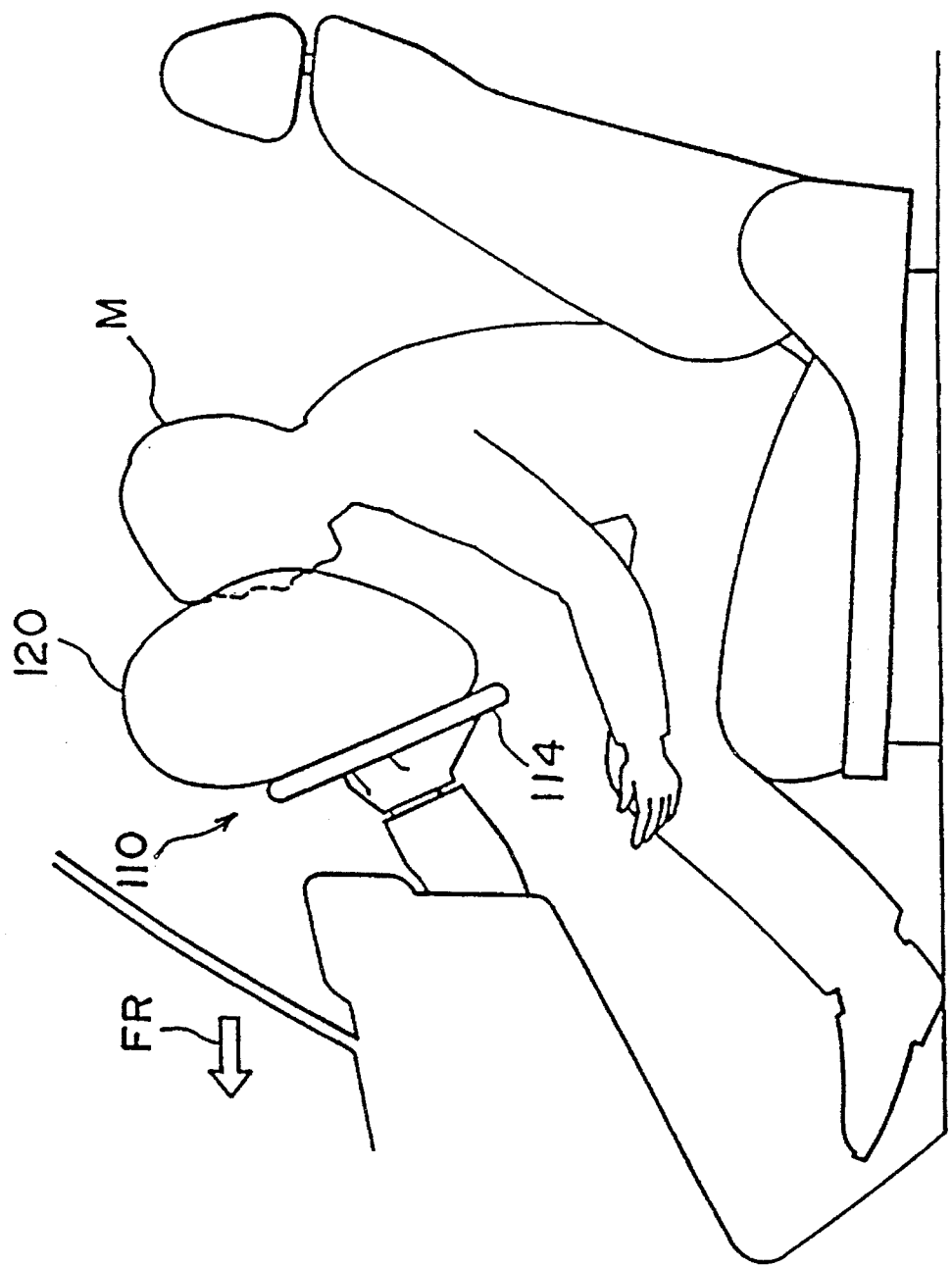
FIG. 7 is a schematic side view of the expanded bag upon actuation of an air bag apparatus to which the bag according to the second embodiment of the present invention is applied.

FIG. 5 shows a partial broken view of an air bag 120 of an air bag apparatus 110 in an inflated state according to a second embodiment. FIG. 6 shows a plan view of the bag 120 while FIG. 7 shows a schematic side view of the air bag 120 inflated by actuation of the air bag apparatus 110 to which the bag 120 is applied. The FR arrow in the figure indicates the direction of the front of the vehicle.

The air bag apparatus 110 is arranged in a center portion of a steering wheel 114. The air bag apparatus 110 has a so-called "stationary bag type" which rotates relative to the steering wheel 114, e.g., the Japanese unexamined patent publication Sho. 59-114143.

The bag 120 is folded and accommodated in the air bag apparatus 110. Further, an inflator 118 for gas generation is mounted in the bag 120. Gas generating materials are sealed in the inflator 118 and in a state of sudden deceleration or the like, the gas generating materials decompose by combustion so as to discharge a large amount of gas with which the bag 120 is inflated.

Now, as shown in detail in FIGS. 5 and 6, the bag 120 is formed into a substantially spherical bag shape by sewing together an upper base fabric 122 and a lower base fabric 124. At a center portion of the lower base fabric 124, a communication hole 126 is formed. The inflator 118 is inserted through and secured to the communication hole 126. In the vicinity of the communication hole 126, a pair of vent holes 128 is formed to absorb an impact by discharging gas after the bag is inflated.

In the plan view as shown in FIG. 6, these upper and lower base fabrics 122 and 124 are formed by cutting off a crescent-like portion from the lower portions thereof (that is, the portion which corresponds to the lower part of the steering wheel 114). Therefore, in a state where the bag 120 is inflated, the portion corresponding to a space between the lower part of the steering wheel 114 and the chest of an occupant M is cut off (made small) as compared with the portion corresponding to a space between the upper part of the steering wheel 114 and the head of the occupant M.

Inside the air bag 120 (the upper base fabric 122 and the lower base fabric 124) straps 130, 132, 134 are disposed. The straps 130 and 132 are positioned on both the left and right sides of the communication hole 126. The strap 134 is disposed at the lower side of the communication hole 126. The straps 130, 132, 134 are connected by sewing the upper ends to the upper base fabric 122 and the lower ends to the lower base fabric 124. When the air bag 120 is inflated, these straps 130, 132, 134 are designed to restrict the inflation of the upper base fabric 122 and the lower base fabric 124 so as to maintain the desired shape of the bag 120.

The operation of the present embodiment will now be described.

In the air bag apparatus 110 of the above construction, when a vehicle has reached a state of sudden deceleration, gas is generated from the inflator 118 to thereby inflate the bag 120 so as to be interposed between the steering wheel 114 and the occupant M. By this action, the occupant M is securely protected.

The air bag apparatus 110 is used in combination with a seat belt apparatus (unillustrated) provided in the vehicle. In other words, the occupant M is protected by the webbing at the chest, in particular of the seat belt apparatus, and the occupant's head is protected by the inflated bag 120. Therefore, in the inflated bag 120, there is no problem even if the portion corresponding to a space between the lower part of the steering wheel 114 and the chest of the occupant M is smaller when compared with the portion corresponding to a space between the upper part of the steering wheel 114 and the head of the occupant M.

Therefore, because the bag 120 is not larger than necessary, unlike the conventional bag, the overall size of the upper base fabric 122 and the lower base fabric 124 constituting the bag 120 can be considerably reduced as compared with the conventional size. Further, because the inflation capacity of the bag 120 is smaller than that of the conventional bag, the quantity of gas generated for instantaneously inflating the bag 120 can also be reduced, thereby making the inflator 118 smaller and lighter.

As described above, the inflation of the air bag 120 of the air bag apparatus according to the present embodiment not only ensures the protection of the occupant M by being interposed in an optimum state between the steering wheel 114 and the occupant M but also is not larger than necessary, thereby reducing the size of the upper base fabric 122 and the lower base fabric 124 and the quantity of gas generated for inflation of the bag so as to reduce cost as well.

In the present invention, the lower parts of the upper base fabric 122 and the lower base fabric 124 constituting the air bag 120 are uniformly cut off in the form of a crescent so as to remove (make small) the portion corresponding to a space between the lower part of the steering wheel 114 and the chest of the occupant M when the air bag 120 is inflated. The present embodiment shall not be limited thereto. In a state where the air bag is inflated, the bag may be formed so that at least the portion of the air bag corresponding to the head of the occupant M inflates without fail so as to be interposed between the steering wheel 114 and the head of occupant M. It is not particularly necessary to form the bag by uniformly cutting off the lower parts of the upper base fabric 122 and the lower base fabric 124 in the form of a crescent. The bag may be formed by cutting off the lower parts of these upper and lower fabrics in other forms (cutting off in a simple straight line, for example).

Having now fully described the invention, it will be apparent to those skilled in the art that many changes and modifications may be made without departing from the spirit and scope of the invention as set forth herein.

What is claimed is:

1. An air bag apparatus to be mounted in a vehicle in an immovable state, said air bag apparatus comprising:

a stationary pad;

means for holding said stationary pad immovable during turning of a steering wheel, said means comprising a planetary gear structure that includes:

a fixed gear having a training portion formed continuously over an outer peripheral surface of said fixed gear, a sun gear having a training portion formed continuously over an outer peripheral surface of said sun gear and wherein said sun gear is rotatable relative to a steering shaft and said stationary pad is mounted on said sun gear, a plurality of planetary gears coupled with said steering wheel, wherein said planetary gears include a training portion formed continuously over an outer peripheral surface of said planetary gears, and a timing belt cooperating with said training portion of said sun gear, said fixed gear and said planetary gears respectively;

a heteromorphic bag accommodated in a folded state in said stationary pad;

an inflator communicating with an interior of said bag, said inflator comprising a means for generating a gas when said vehicle is subjected to sudden deceleration, a means for jetting said gas into said interior of said bag, and a means for coupling said inflator and said bag and securing said jetting means within said bag; and a plurality of restricting members formed by a soft material, both ends of each of said plurality of restricting members mounted on a surface of an inner circumference of said bag so as to restrict the expanding height of said bag which tends to expand in the form of a sphere towards the side of an occupant by said gas jetting upon sudden deceleration of said vehicle, wherein, said bag in an inflated state is formed so that the portion corresponding to a portion other than the head of an occupant is smaller as compared with the portion corresponding to the head of said occupant, and said portion corresponding to a portion other than the head of said occupant is bounded by a lower portion of said bag formed into a substantially straight line.

2. The air bag apparatus according to claim 1, wherein said bag is formed so that said portion corresponding to a portion other than the head of said occupant is shaped in a different form from the portion corresponding to said head of said occupant.

3. An air bag apparatus disposed in a vehicle in an immovable state, wherein a bag is inflated in a state of sudden deceleration of said vehicle to protect an occupant by being interposed between a vehicle body and said occupant, said air bag apparatus comprising:

a stationary pad;

means for holding said stationary pad immovable during turning of a steering wheel, said means comprising a planetary gear structure including a fixed gear having a training portion formed continuously over an outer peripheral surface of said fixed gear, a sun gear having a training portion formed continuously over an outer peripheral surface of said sun gear and wherein said sun gear is rotatable relative to a steering shaft and said stationary pad is mounted on said sun gear, a plurality of planetary gears coupled with said steering wheel, wherein said planetary gears include a training portion formed continuously over an outer peripheral surface of said planetary gears, and a timing belt cooperating with said training portion of said sun gear, said fixed gear and said planetary gears respectively; and a heteromorphic bag accommodated in a folded state in said stationary pad, said bag including, in its inflated state, a portion corresponding to the head of said occupant and a portion corresponding to a portion other than said head of said occupant, wherein said bag in said inflated state is formed so that said portion corresponding to a portion other than the head of said occupant is made smaller as compared with said portion corresponding to the head of said occupant, wherein said portion corresponding to a portion other than the head of said occupant is bounded by a lower portion of said bag formed into a substantially straight line.

4. The air bag apparatus according to claim 3 wherein said bag is formed so that said portion corresponding to a portion other than the head of said occupant is shaped in a different form from said portion corresponding to the head of said occupant.

* * * * *